(12) United States Patent
Nessler et al.

(10) Patent No.: US 11,458,960 B2
(45) Date of Patent: Oct. 4, 2022

(54) PARKING ASSISTANCE DEVICE

(71) Applicant: Honda Motor Co., Ltd., Tokyo (JP)

(72) Inventors: Jens Nessler, Offenbach (DE); Marcus Kleinehagenbrock, Offenbach (DE); Robert Kastner, Offenbach (DE); Christoph Kerkeling, Offenbach (DE)

(73) Assignee: HONDA MOTOR CO., LTD., Tokyo (JP)

( * ) Notice: Subject to any disclaimer, the term of this patent is extended or adjusted under 35 U.S.C. 154(b) by 196 days.

(21) Appl. No.: 16/884,358

(22) Filed: May 27, 2020

(65) Prior Publication Data

US 2020/0377077 A1 Dec. 3, 2020

(30) Foreign Application Priority Data

May 28, 2019 (DE) .................. 10 2019 207 804.4

(51) Int. Cl.
| | |
|---|---|
| *B60W 30/06* | (2006.01) |
| *B60W 60/00* | (2020.01) |
| *G05D 1/00* | (2006.01) |
| *G08G 1/00* | (2006.01) |
| *B60Q 5/00* | (2006.01) |

(52) U.S. Cl.
CPC ............ *B60W 30/06* (2013.01); *B60Q 5/005* (2013.01); *B60W 60/0025* (2020.02); *G05D 1/0011* (2013.01); *G08G 1/20* (2013.01); *G08G 1/22* (2013.01)

(58) Field of Classification Search
CPC ... B60W 30/06; B60W 60/0025; B60Q 5/005; G05D 1/0011; G08G 1/20; G08G 1/22
See application file for complete search history.

(56) References Cited

U.S. PATENT DOCUMENTS 10,073,450 B2 * 9/2018 Leppanen ............ B62D 15/027
10,532,737 B2    1/2020 Beauvais et al.
(Continued)

FOREIGN PATENT DOCUMENTS

DE    10 2016 208 991 A1    11/2017
DE    10 2018 111 522 A1    11/2018

OTHER PUBLICATIONS

Search Report in German dated Feb. 26, 2020, issued in counterpart DE Application No. 10 2019 207 804.4 (7 pages).

*Primary Examiner* — Navid Z. Mehdizadeh
*Assistant Examiner* — Ryan Shi Leong
(74) *Attorney, Agent, or Firm* — WHDA, LLP

(57) ABSTRACT

The invention relates to a parking assistance device, comprising an autonomous vehicle detecting unit adapted to detect whether a parked vehicle is an autonomous vehicle (16) capable of moving autonomously, a parking space optimization area detecting unit adapted to detect at least one parking space optimization area (20), a distance measuring unit adapted to measure a distance (24) in front of or behind the at least one autonomous vehicle (16), a parking spot determining unit adapted to determine whether or not a subset of the distances (24) measured by the distance measuring unit is equal to or larger than a predetermined distance required for parking a host vehicle (26), and a communication unit (38) adapted to output a movement command to the at least one parked autonomous vehicle (16). The invention further relates to an according parking assistance method.

14 Claims, 7 Drawing Sheets

(56) References Cited

U.S. PATENT DOCUMENTS

| | | | |
|---|---|---|---|
| 2015/0123818 A1* | 5/2015 | Sellschopp | G08G 1/096816 340/932.2 |
| 2018/0022344 A1* | 1/2018 | Tseng | B60W 30/06 701/23 |
| 2018/0334164 A1* | 11/2018 | Stefan | G08G 1/143 |
| 2020/0108824 A1* | 4/2020 | Bettger | G05D 1/0231 |
| 2020/0307559 A1* | 10/2020 | Goricke | B60W 30/06 |
| 2021/0323537 A1* | 10/2021 | Fan | B60W 30/12 |

\* cited by examiner

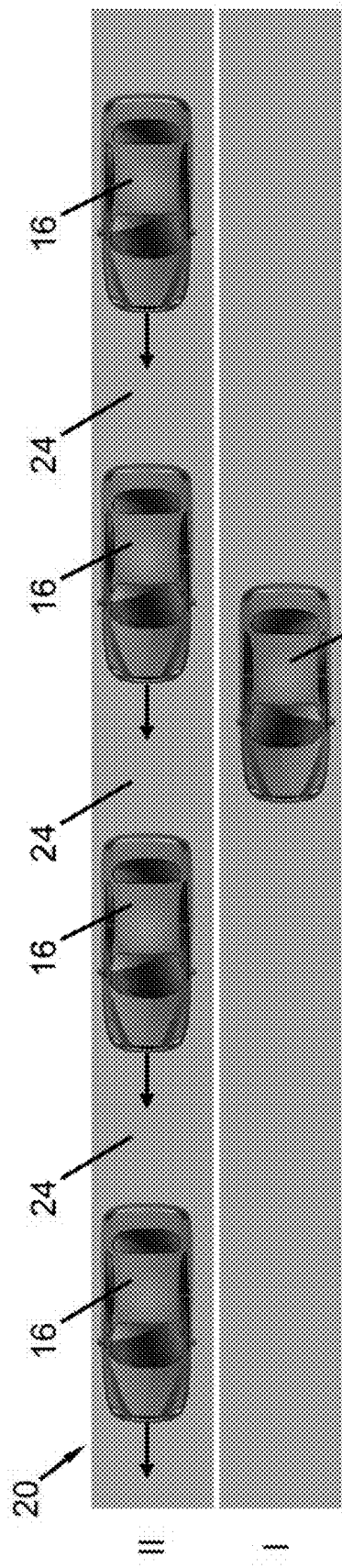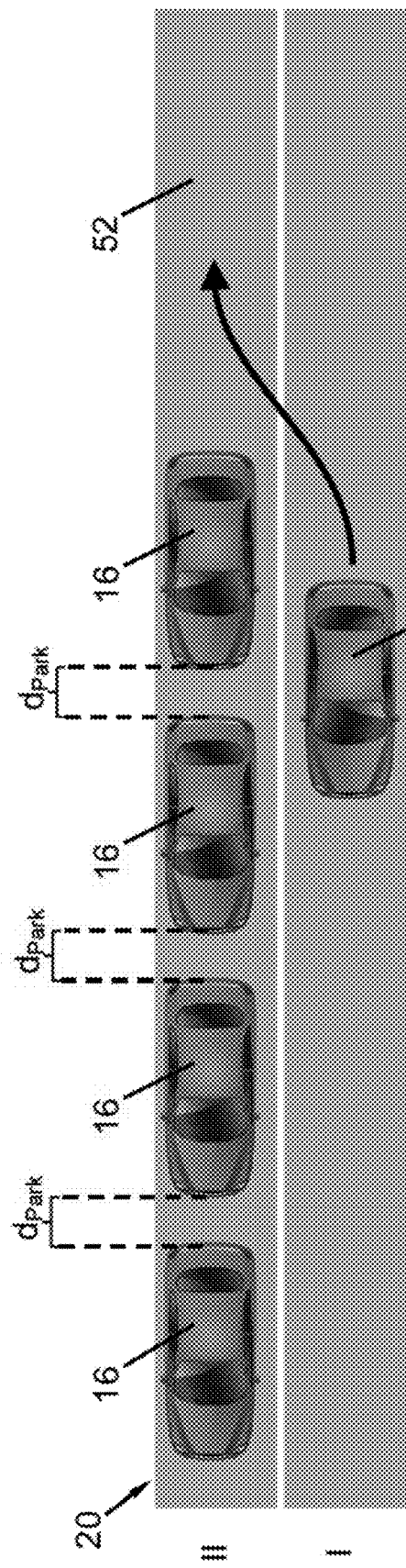
FIG. 3a
FIG. 3b

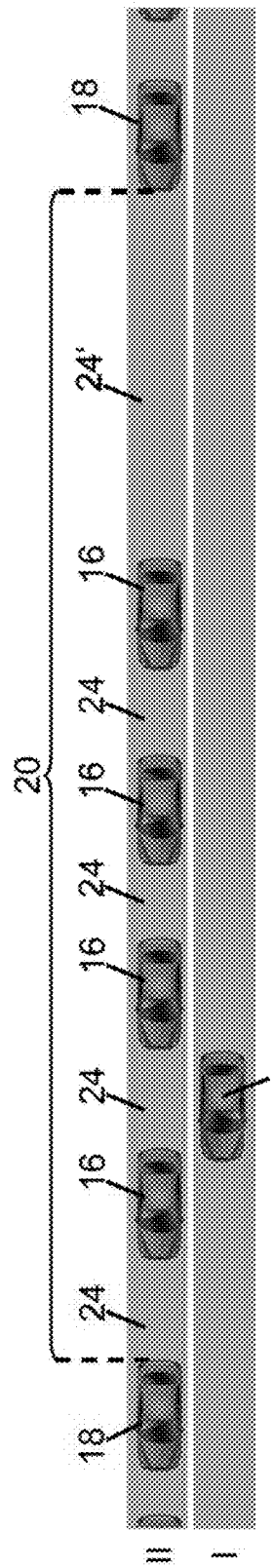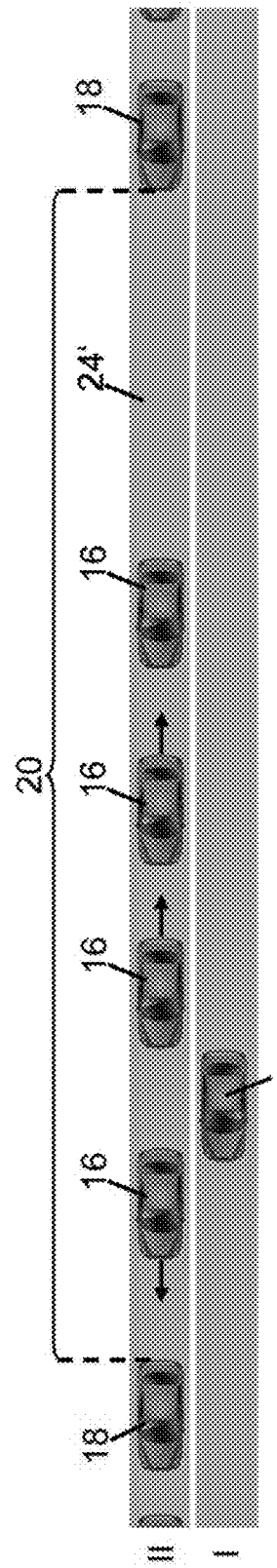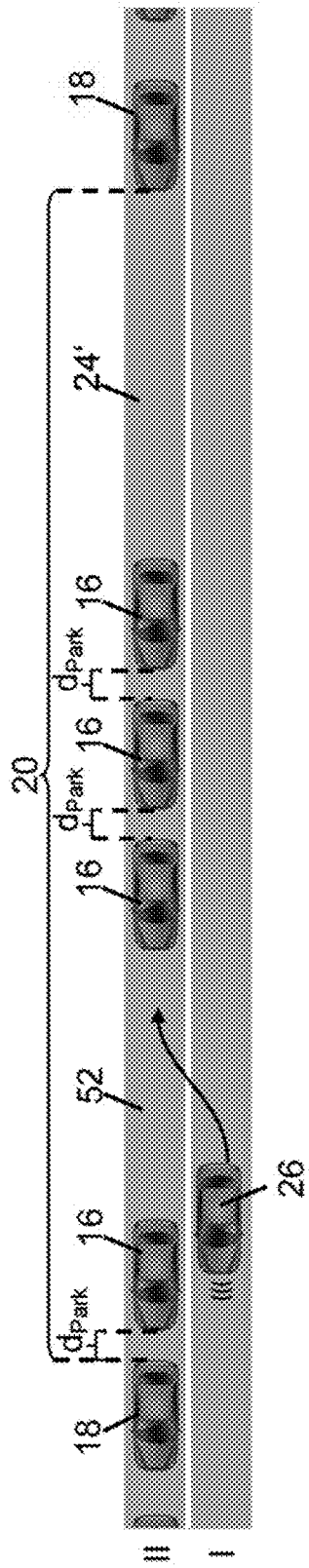

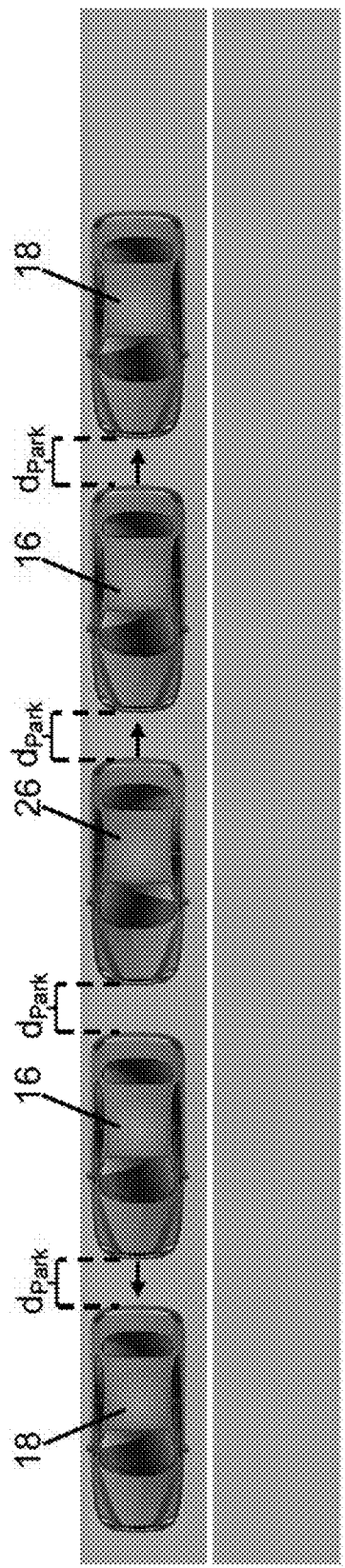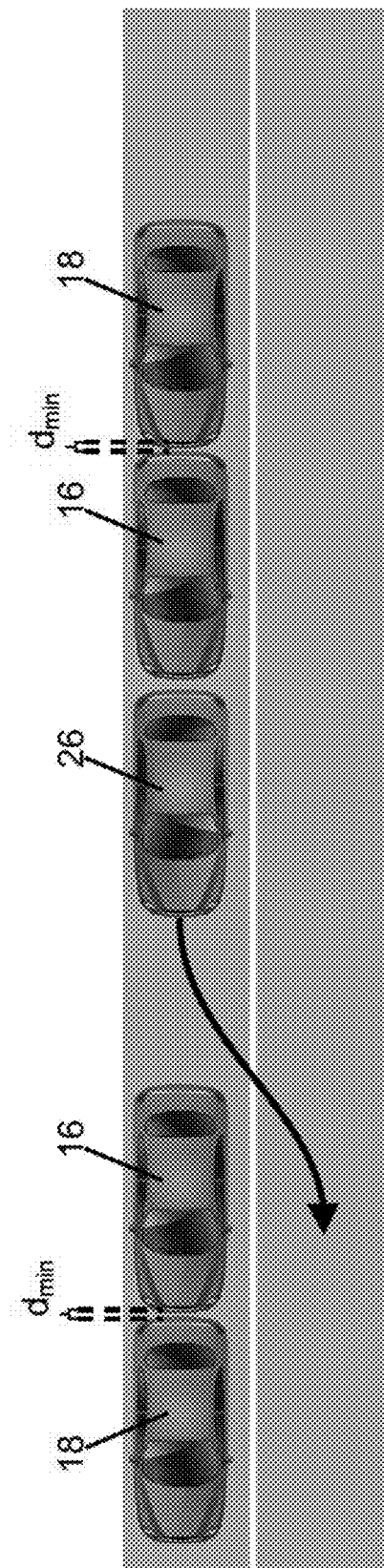
FIG. 6a
FIG. 6b

PARKING ASSISTANCE DEVICE

CROSS-REFERENCE TO RELATED APPLICATION

This application claims priority of Patent Application No. 10 2019 207 804.4 filed in Germany on May 28, 2019, the contents of which is hereby incorporated by reference herein in its entirety.

BACKGROUND OF THE INVENTION

Field of the Invention

The invention relates to a parking assistance device adapted to be mounted in a host vehicle.

Description of Related Art

Known parking assistance devices of host vehicles are designed to detect a parking spot just by comparing the host vehicle's length (plus some space for maneuvering) with a free length between two objects. These systems do not differ between an object being another vehicle and an object being something else, e.g. a tree. As a consequence, for example, in the case that multiple free spaces that are located between consecutive vehicles are just slightly too small for the host vehicle to enter, prior art parking assistance devices do not recognize these space as possible parking spots. Hence, a lot of space that may be used for parking is left unused.

SUMMARY OF THE INVENTION

It is therefore the object of the present invention to provide a parking assistance device that is capable of optimizing a given situation of parked vehicles for the host vehicle.

This object is solved by a parking assistance device adapted o be mounted in a host vehicle, comprising:
an autonomous vehicle detecting unit adapted to detect whether a vehicle parked within a predetermined range in the vicinity of the host vehicle is an autonomous vehicle capable of moving autonomously,
a parking space optimization area detecting unit adapted to detect at least one parking space optimization area as an area, in which a consecutive number of at least one autonomous vehicle is parked between a first end of the parking space optimization area defined by an object that is not capable to be moved autonomously or an end of an associated parking allowance area in front of the consecutive number of at least one autonomous vehicle and a second end of the parking space optimization area defined by another object that is not capable to be moved autonomously or another end of an associated parking allowance area behind the consecutive number of at least one autonomous vehicle,
a distance measuring unit adapted to measure a distance in front of or behind the at least one autonomous vehicle parked in the at least one parking space optimization area,
a parking spot determining unit adapted to determine whether or not at least a subset of the distances measured by the distance measuring unit is equal to or larger than a predetermined distance required for parking the host vehicle, and
a communication unit adapted to output a movement command to the at least one parked autonomous vehicle, said movement command including an identification information for identifying one of the at least one parked autonomous vehicle and a direction information indicating whether the identified autonomous vehicle is to be moved in the forward direction or in the backward direction.

Thus, the parking assistance device according to the present invention enables the host vehicle to "rearrange" the parked autonomous vehicle(s) such that at least some of the distances in front of and/or behind the parked autonomous vehicle(s) may be summed up to at least one large parking spot.

The parking assistance device may be configured to only output the movement command in case that the parking spot determining unit does not determine a distance that is equal to or larger than a predetermined distance required for parking the host vehicle within the line of detected parked autonomous vehicles (wherein the line may contain at least one parked autonomous vehicle) in one parking, space optimization area. in addition or as an alternative, the parking assistance device may be configured to output the movement command, irrespective of the fact whether or not the parking spot determining unit has determined a distance that is equal to or larger than a predetermined distance required for parking the host vehicle, based on a determination of the parking assistance device that the parking positioning of at least one parked autonomous vehicle may be optimized, i.e. the free spaces in front of and behind the at least one parked autonomous vehicle may be reduced on one side and increased on the other side. This may enable other vehicles, e.g. also vehicles that are not provided with a parking assistance device according to the present invention, to find a suitable parking spot in an optimized parking space.

The parking assistance device, in particular, for example, the distance measuring unit, may be adapted to determine whether or not the parking positioning of at least one parked autonomous vehicle may be optimized within a parking space optimization area such that a parking spot may be generated that is large enough for parking the host vehicle. A result of this determination may be output to the user of the host vehicle and/or may be used by the host vehicle to adapt a preset action plan that sets the host vehicle's next actions, e.g. to start a parking maneuver or to continue travelling. For example, if it is determined that no parking spot may be generated that is large enough for parking the host vehicle, the parking assistance device may be adapted to not output the movement command.

The parking assistance device, in particular, for example, the distance measuring unit and/or the communication unit, may further be adapted to determine and/or receive from the at least one parked autonomous vehicle at least one of the number of vehicles parked in a parking space optimization area, the length of each parked autonomous vehicle, the position of each parked autonomous vehicle in the parking space optimization area, and the free space in front of and/or behind each parked autonomous vehicle in the parking space optimization area.

Of course, within the scope of this invention, an "object" can be any kind of object, e.g. a tree, a vehicle, a boundary etc., but for the sake of simplicity, the following description refers to "vehicles", in particular vehicles that are not capable of being moved autonomously, as an exemplary object, unless explicitly stated otherwise. Also, a vehicle capable of being moved autonomously but already parked dose enough (explained below in greater detail) to an adjacent vehicle or object in a direction of a possible movement may be considered as an immovable object here.

It is to be understood that the term "length of a vehicle" refers to the dimension of a vehicle in its main driving direction, i.e. its dimension from front to back. Analogously, the term "length/space of the parking spot" refers to the dimension of the parking spot that is substantially parallel to the length of the vehicle parked in the parking spot.

Units of the present invention that are used as measurement or/and detection units for the parking assistance device may be based on environmental sensors, e.g. radar sensors, lidar sensors, ultrasonic sensors, cameras etc. Of course, these sensors may also be used for other purposes in the host vehicle, e.g. for adaptive cruise control. It may also be conceivable that the host vehicle uses sensors that are installed in other vehicles by communicating with the other vehicle, when autonomously moving a parked autonomous vehicle from its parking position, for example.

Here, the host vehicle may be an autonomous vehicle itself that, for example, is set into a parking mode by a user or is called remotely from a parking position (also known as "valet parking"), or may be a conventional vehicle actively driven by a user of the host vehicle.

It shall further be mentioned that the distance that is measured by the distance measuring unit does not necessarily have to comprise the acquisition of absolute values. Instead, the distance measuring unit may also compare a distance in front of or behind the at least one autonomous vehicle parked in the at least one parking space optimization area with one or more predetermined distances.

The present application is not only applicable to a situation in which the host vehicle is entering a parking spot but also to a situation in which the host vehicle is departing from a parking spot.

In an embodiment of the present invention said movement command may further include a distance information indicating by which distance the identified autonomous vehicle is to be moved. The identified autonomous vehicle does not necessarily have to comprise distance sensors of its own that may be used to detect a distance to an adjacent object but the host vehicle may communicate this distance information to the identified autonomous vehicle. The identified autonomous vehicle may then be moved, i.e. move itself, for the communicated distance in the determined direction.

Additionally, the movement command may be configured to trigger all of the parked autonomous vehicles detected by the autonomous vehicle detection unit to be moved for optimizing the parking space optimization area to move into the same direction. This provides an easy way of optimizing a parking space optimization area, since all or at least the consecutive autonomous vehicles of this parking space optimization area that have to be moved to generate the parking spot for the host vehicle are instructed to move forwards or backwards, leaving a maximum parking spot at one end of the line of autonomous vehicles in the parking space optimization area.

Alternatively, the movement command may be configured to trigger all of the parked autonomous vehicles detected by the autonomous vehicle detection unit to be moved for optimizing the parking space optimization area to move in a direction away from a location where a distance currently or recently measured by the distance measuring unit is located. It is therefore possible to create an optimized parking spot (i.e. an area being the sum of at least some available free spaces in that parking space optimization area after a rearrangement of the at least one parked autonomous vehicle) that is not located at one end of the line of parked autonomous vehicles.

The parking assistance device may further comprise a parking spot setting unit adapted to set a location that is closest to the host vehicle as a parking spot to be optimized by the parking assistance device within the parking space optimization area. This enables the host vehicle itself and/or the user of the host vehicle to determine a desired location where the host vehicle shall be parked within the line of parked autonomous vehicles. So, if, for example, the user of the host vehicle intends to park at a certain location, e.g. in front of a specific building, the parking spot setting unit may set this location as the desired parking spot. The parking assistance device may then rearrange the at least one parked autonomous vehicle of the line of parked autonomous vehicles in an according parking space optimization area to create a parking spot at this desired location. In case that it is not possible to create a parking spot at that exact desired location, for example due to an object being not an autonomously movable vehicle, the parking assistance device and/or the parking spot setting unit may be adapted to determine a next location closest to the desired location as a parking spot to be optimized by the parking assistance device.

In this regard, the parking spot setting unit may also be adapted to set the location closest to the host vehicle as a parking spot to be optimized only when the velocity of the host vehicle is equal or below a predetermined threshold. To stop or at least to slow down the host vehicle below the predetermined velocity threshold provides a simple method to select a location as a desired parking spot because no further user interaction may here be necessary that might distract the user.

In another embodiment of the present invention, said movement command may further include a parking distance information indicating at which predetermined distance to an object, towards which the identified autonomous vehicle is approaching in response to the movement command, the identified autonomous vehicle is to be stopped. So, an optimized parking distance between a parked autonomous vehicle and another parked vehicle or object in front of and/or behind the parked autonomous vehicle may be defined.

In case that the host vehicle may enter a suitable parking spot in an already optimized parking space or the host vehicle may leave from its parking spot in an already optimized parking space, the parking assistance device may also be adapted to communicate a movement command to the at least one identified autonomous vehicle within the same parking space optimization area that triggers the at least one identified autonomous vehicle to temporarily go below the defined parking distance in order to temporarily maximize the length of the parking spot that the host vehicle is intending to enter/leave. After the host vehicle has finished its parking maneuver, the at least one identified autonomous vehicle may be triggered to take or regain its defined parking distance.

Here, the predetermined distance may be individually adjustable for each distance and/or for each autonomous vehicle. The term "individually" may not only be understood as different from one autonomous vehicle to another autonomous vehicle but also as different on each side of one autonomous vehicle. In this regard, a parked vehicle may be associated with at least one label that may be used to adjust the predetermined distance. For example, if a parked vehicle is used to load/unload items from a trunk of the vehicle, the predetermined distance may be set to a larger value on the side of the trunk than on the other side of this vehicle. As another example, if a parked vehicle is parked in the course of a valet parking operation and no access to the trunk of the vehicle is required, the predetermined distance may be set to a low value on both sides of this vehicle.

Advantageously, the parking assistance device may further comprise an environment monitoring unit adapted to monitor an environment surrounding the host vehicle. Doing so, the host vehicle may prohibit or adapt the communication of a movement command to at least one parked autonomous vehicle when it is detected that an object, in particular a person, is situated in the autonomous vehicle's travel path. This may also be applicable to the host vehicle itself in case that the host vehicle is an autonomous vehicle, too.

The environment monitoring unit may be adapted to monitor the environment surrounding the host vehicle every time a preset time period has lapsed. This may reduce an energy consumption for monitoring the environment because a continuous monitoring usually requires a lot of energy.

The parking assistance device may further comprise a warning unit adapted to output a warning signal by using visual and/or acoustical means to the surrounding environment of the host vehicle indicating that the host vehicle is moving and/or is about to move. For example, when a pedestrian likes to cross the parking space that the vehicles are parked in, the warning unit may warn the pedestrian that the host vehicle will move soon or is already moving such that an injury of the pedestrian and/or a damage of the host vehicle may be avoided.

Further, said movement command may include an action information indicating that the host vehicle is moving or intending to move. The action information may be adapted to activate warning signals, e.g. at least one indicator, of the parked autonomous vehicle to be moved in order to warn people in the surrounding of the autonomous vehicle about its movement.

In another embodiment of the present invention, the communication unit may be further adapted to output a movement command to the at least one parked autonomous vehicle in response to at least one of unlocking the host vehicle, starting the host vehicle, and a remote travel request received by the host vehicle. Here, the term "remote travel request" shall be understood as a part of a valet parking operation, as already discussed above, in which a user of the host vehicle sends the host vehicle autonomously to a remote parking spot and/or calls it remotely from this parking spot to a desired location, for example the current location of the user. Each of the above mentioned actions may indicate that the host vehicle is about to move from its current position.

In another aspect, the present invention relates to a parking assistance method, comprising the steps of:
detecting whether a vehicle parked within a predetermined range in the vicinity of the host vehicle is an autonomous vehicle capable of moving autonomously,
detecting at least one parking space optimization area as an area in which a consecutive number of at least one autonomous vehicle is parked between a first end of the parking space optimization area defined by an object that is not capable to be moved autonomously or an end of an associated parking allowance area in front of the consecutive number of at least one autonomous vehicle and a second end of the parking space optimization area defined by another object that is not capable to be moved autonomously or another end of an associated parking allowance area behind the consecutive number of at least one autonomous vehicle,
measuring distances in front of or behind the at least one autonomous vehicle parked in the at least one parking space optimization area,
determining whether or not at least a subset of the measured distances is equal to or larger than a predetermined distance required for parking the host vehicle, and
outputting a movement command to the at least one parked autonomous vehicle, said movement command including an identification information for identifying one of the at least one parked autonomous vehicle and a direction information indicating whether the identified autonomous vehicle is to be moved in the forward direction or in the backward direction.

It shall already be mentioned at this point that all features, effects and advantages described with respect to the parking assistance device according to the present invention may also be applicable to the parking assistance method, and vice versa.

Advantageously, said movement command may further include a parking distance information indicating at which predetermined distance to an object, towards which the identified autonomous vehicle is approaching in response to the movement command, the identified autonomous vehicle is to be stopped and/or said movement command may further include a distance information indicating by which distance the identified autonomous vehicle is to be moved. When moving the at least one parked autonomous vehicle towards another vehicle or object, sensors built in the at least one parked autonomous vehicle may be used, for example by the host vehicle, to determine a distance of the identified autonomous vehicle to an object in front of and/or behind it.

The direction of the direction information of the movement command in which the identified autonomous vehicle is to be moved may be determined according to the smaller value of a comparison of the two travel distances the identified autonomous vehicle has to travel in each direction. These two travel distances are determined based on a first travel model for a respective parked autonomous vehicle in which the respective parked autonomous vehicle travels forwards to an optimized parking position determined by the parking assistance method, for example in a predetermined distance to an object/vehicle in front of the respective parked autonomous vehicle, and a second travel model in which the respective parked autonomous vehicle travels backwards to an optimized parking position determined by the parking assistance method, for example in a predetermined distance to an object/vehicle behind of the respective parked autonomous vehicle.

As a result, the parking assistance method may also be adapted to determine the smallest travel amount for each parked autonomous vehicle to be moved to an optimized parking position such that an energy consumption for the parking optimization is reduced for each vehicle to be moved.

It shall also be mentioned that a user of an autonomous vehicle may deactivate the capability of moving the vehicle for a parking optimization actively or the autonomous vehicle may deactivate the capability of moving the vehicle for a parking optimization itself, e.g. due to the fact that a threshold state of charge and/or fuel level is reached. An autonomous vehicle deactivated for a parking optimization may be regarded as an "object" in terms of the present invention, i.e. a non-autonomously movable vehicle.

It is furthermore conceivable that the host vehicle communicates a movement command in order to optimize the parking space optimization area that the host vehicle is parked in during a parking period of the host vehicle. This may be performed each time a predefined time period has lapsed or each time that is has been detected by the host vehicle that a vehicle has entered and/or left the parking space optimization area that the host vehicle is parked in, for example.

The parking assistance method may further consider whether a parking maneuver and an unparking maneuver occur in the same parking space optimization area at the same time. If so, the unparking maneuver may get a higher priority, e.g. by delaying the parking maneuver, since, after the unparking maneuver is completed, the parking maneuver becomes easier. Also, an automated parking optimization process during a parking period of the host vehicle has a lower priority than a parking maneuver or an unparking maneuver of the host vehicle or another vehicle.

If the at least one parked autonomous vehicle is an electric vehicle that is inductively chargeable and is parked in a zone with inductive charging features, a line of such autonomous vehicles consecutively parked in the inductive charging zone may be regarded as one parking space optimization area. Thus, an end of the parking space optimization area may be constituted by an object not being autonomously movable, an end of a parking space or an end of the inductive charging zone. So, an autonomously movable vehicle may be moved in the parking space optimization area without reducing the state of charge of the vehicle.

BRIEF DESCRIPTION OF THE DRAWINGS

The present invention will be further described in greater detail with respect to the accompanying drawings in which:

FIG. 3a shows a first embodiment of optimizing a parking situation;

FIG. 3b shows the parking situation of FIG. 3a being optimized;

FIG. 4a shows a second embodiment of optimizing a parking situation;

FIG. 4b shows an ongoing optimization of the parking situation of FIG. 4a;

FIG. 4c shows the parking situation of FIG. 4a being optimized;

FIG. 6a shows the start of an unparking situation of the host vehicle;

FIG. 6b shows the ongoing unparking situation of the host vehicle; and

DETAILED DESCRIPTION OF THE INVENTION

Below parking situations are described with respect to the drawings showing parking maneuvers on a right side of a road with respect to a travelling direction which may occur in both types of traffic systems, the right-hand traffic system for roads having lanes in both travelling directions and the left-hand traffic system for one way roads, for example. Of course, the present invention is also applicable for parking situations on a left side of a road for which the shown situations just have to be mirrored.

Figure 1:
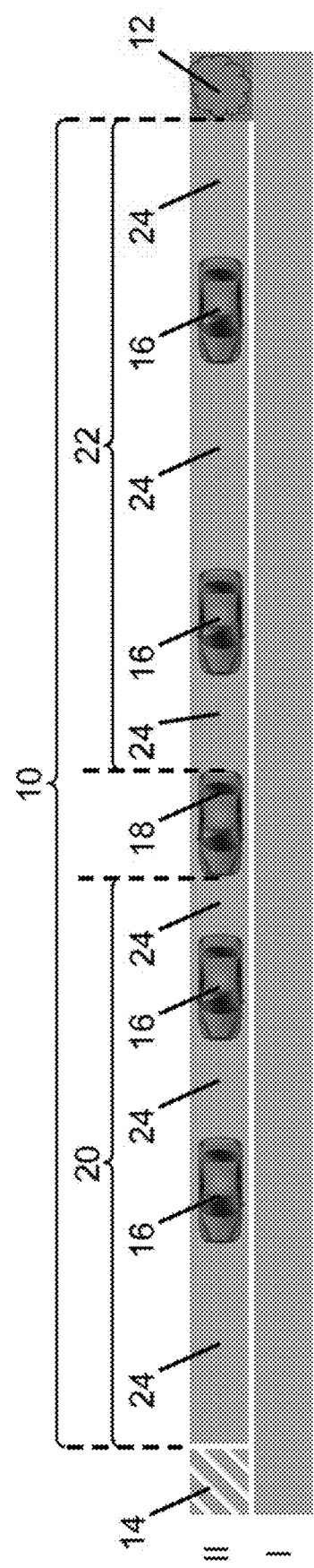
FIG. 1 shows an example of a parking situation in a plan view.

In FIG. 1 a part of a road is shown, wherein lane I is a driving lane and lane II is a parking lane parallel to the driving lane I. The parking lane II comprises a parking space (or parking area) 10 which is bordered by an object 12, in this example a tree, on its one end and a no-parking zone 14 on its other side.

Within the parking space 10 a plurality of vehicles are parked, wherein vehicles 16 are vehicles that are capable to be autonomously moved and vehicle 18 is not provided with this capability. Hence, vehicle 18 is also considered as an immovable object that divides the parking space 10 into two parking space optimization areas 20 and 22. In between the autonomous vehicles 16 there are free spaces (or gaps) 24 which are randomly distributed within each parking space optimization area 20, 22.

Figure 2:
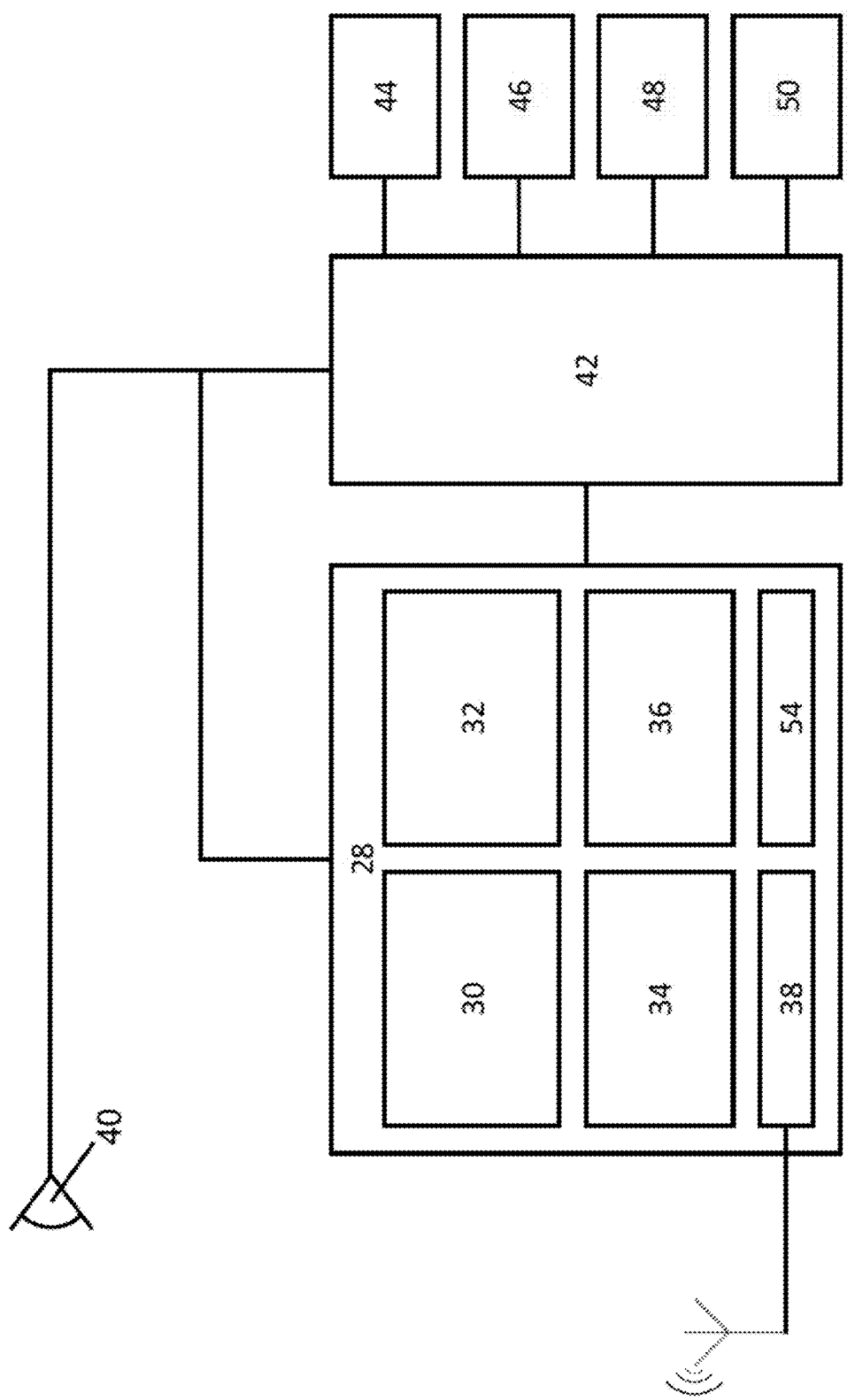
FIG. 2 shows an example of a parking assistance device according to the present invention.

FIG. 2 describes an exemplary embodiment of a parking assistance device according to the present invention.

The parking assistance device 28 according to the present invention includes an autonomous vehicle detecting unit 30 adapted to detect the autonomous vehicles 16 capable of moving autonomously parked within the parking space 10 in the parking lane II, a parking space optimization area detecting unit 32 adapted to detect the parking space optimization area 20 as an area in which a consecutive number of autonomous vehicles 16 is parked between the first 14 and second 18 end of the parking space optimization area 20, a distance measuring unit 34 adapted to measure a distance 24 in front of or behind the autonomous vehicles 16 parked in the parking space optimization area 20, and a parking spot determining unit 36 adapted to determine whether or not at least a subset of the distances 24 measured by the distance measuring unit 34 is equal to or larger than a predetermined distance $d_{CarLen}$ being the length of the host vehicle 26 including an additional margin necessary to maneuver the host vehicle 26 into a parking spot.

For example, in the case that the parking spot determining unit 36 has determined that there is no distance 24 being equal to or larger than the predetermined distance $d_{CarLen}$, a communication unit 38 outputs a movement command to each parked autonomous vehicle 16 to be moved for optimizing the parking space optimization area 20, including a direction information indicating whether the autonomous vehicle 16 is to be moved in the forward direction or in the backward direction.

Here, the parking assistance device 28 is connected to at least one environmental sensor 40, e.g. camera, radar, lid r, C2X etc., and to a prior art automated control 42 which may interact with a throttle 44, a brake 46, a steering 48 and/or a HMI 50 of the host vehicle 26.

In FIG. 3a, the host vehicle 26 has approached the parking space optimization area 20 and has commanded all vehicles 16 to move forwards such that the free spaces 24 between the autonomous vehicles 16 are summed up to an optimized parking spot 52 generated here at the end of the line of autonomous vehicles 16 (FIG. 3b). The host vehicle 26 may then enter the parking spot 52 in the parking lane II. The autonomous vehicles 16 are parked in a predetermined distance $d_{Park}$ to each other, wherein the distances $d_{Park}$ are substantially identical in the example shown in FIG. 3b but may also be different to each other.

FIGS. 4a to 4c show a second embodiment of the present invention in which a user of the host vehicle 26 may choose a location where an optimized parking spot 52 shall be generated within the line of autonomous vehicles 16.

The host vehicle 26 decelerates below a threshold velocity $v_{limit}$ or even stops at the location where the host vehicle 26 is intended to be parked as shown in FIG. 4a. The host vehicle 26, in particular the distance measuring unit 34, may continuously measure distances 24 that the host vehicle 26 passes by while travelling. So, the intended parking spot may be determined by a parking spot setting unit 54 (FIG. 2) at the last distance that was measured by the distance measuring unit 34.

As shown in FIG. 4b, here the direction information included in the movement command sent by the host vehicle 26 to the autonomous vehicles 16 indicates for each vehicle located in front of the host vehicle 26 to move forwards and indicates for each vehicle located behind the host vehicle 26 to move backwards from their corresponding parking positions within the parking lane II. In the situation shown in FIGS. 4a to 4c, the free spaces 24 are sufficient to generate an optimized parking spot 52 for the host vehicle 26. Hence, the free space 24' does not have to be changed, even if the vehicle adjacent to the free space 24' and parked within the parking space optimization area 20 (the vehicle 16 to the left of the free space 24' in FIG. 4b) is an autonomous vehicle 16 capable of being moved autonomously.

In FIG. 4c the optimized parking space optimization area 20 is shown, wherein the host vehicle 26 has already moved forward a little bit in order to enter the optimized parking spot 52. Also, the autonomous vehicles 16 are parked in the predetermined parking distance $d_{Park}$ as mentioned above.

Figure 5A:
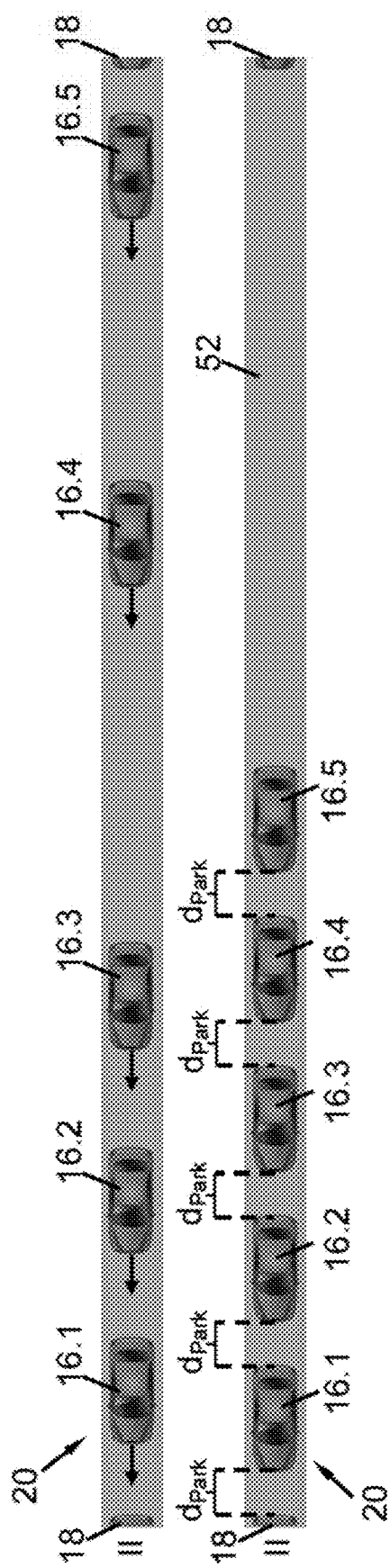
FIG. 5a shows a parking situation to be optimized at the top and an optimized parking situation at the bottom, wherein all vehicles to be moved travel in the same direction.
Figure 5B:
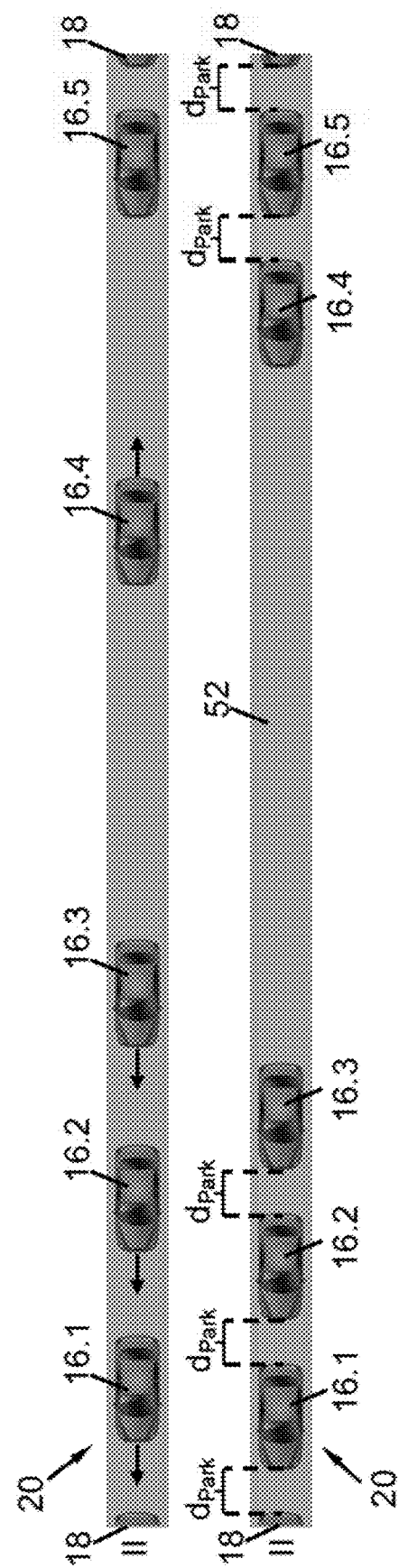
FIG. 5b shows a parking situation to be optimized at the top and an optimized parking situation at the bottom, wherein only some of the vehicles to be moved travel in the same direction.

In addition or as an alternative to the host vehicle 26 selecting where the optimized parking spot 52 shall be generated, the parking assistance device 28 according to the present invention may consider the travel distance each autonomous vehicle 16 has to travel to reach its optimized position. As a comparison, FIGS. 5a and 5b describe examples of the travel path for each autonomous vehicle 16 without (FIG. 5a) and with (FIG. 5b) this consideration. FIG. 5a shows in its upper illustration that all autonomous vehicles 16 receive a movement command to move forwards to an optimized parking position that is shown in the lower illustration of FIG. 5a. As a result of the example of FIG. 5a, the autonomous vehicle 16.1 to the very left in FIG. 5a has travelled 1.9 m, the autonomous vehicle 16.2 has travelled 3.8 m, the autonomous vehicle 16.3 has travelled 6.3 m, the autonomous vehicle 16.4 has travelled 21.3 m, and the autonomous vehicle 16.5 has travelled 31.9 m. The sum of moved distances here is 65.2 m. FIG. 5b shows in its upper illustration that each autonomous vehicle 16 is moved by a received movement command in that direction in which a travel distance to an optimized parking position is smaller (than in the opposite direction). As a result of the example of FIG. 5b, the autonomous vehicle 16.1 to the very left in FIG. 5b has travelled 1.9 m, the autonomous vehicle 16.2 has travelled 3.8 m, the autonomous vehicle 16.3 has travelled 6.3 m, the autonomous vehicle 16.4 has travelled 10.7 m, and the autonomous vehicle 16.5 has travelled 0 m, since its parking distance to the adjacent object behind it already substantially equals the optimized parking distance $d_{Park}$. The sum of moved distances here is 22.7 m.

A calculation which travel direction to an optimized parking position is smaller and thus shall be performed, may, for example, be based on the following information:

An array veh_length[N] of all lengths of autonomous vehicles 16, sorted by vehicle positions;

An array veh_space_in_front[N] of all gaps in front of the vehicles 16; and

An array veh_space_in_rear[N] of all gaps behind the vehicles 16.

If there are N vehicles, then there are N+1 gaps. Each gap could be made the optimized parking spot 52. If gap $x \in \{1, \ldots, N+1\}$ should become the optimized parking spot 52, then vehicles 1 to x-1 have to move to the front and vehicles x to N have to move (in reverse order) to the rear. Therefore, calculating the following distances a vehicle would move in an potential optimization, $i \in \{1, \ldots, N\}$:

veh_total_dist_to_front[i] =
$$\sum_{j=1}^{i}(\text{veh\_space\_in\_front}[j] - d_{Park}) + \sum_{k=1}^{i-1} \text{veh\_length}[k]$$

veh_total_dist_to_rear[i] =
$$\sum_{j=i}^{N}(\text{veh\_space\_in\_rear}[j] - d_{Park}) + \sum_{k=i+1}^{N} \text{veh\_length}[k]$$

The following algorithm uses the values calculated above:

```
minimal_dist = 0xFFFFFFFF // Largest possible value
best_gap = -1
for_each (gap x in (1, ..., N+1)
    current_dist = 0
    for_each (vehicle y in {1, ..., N})
        if (x < y)
            // Assume vehicle y will move forward
            current_dist += veh_total_dist_to_front[y]
        else
            // Assume vehicle y will move backward
            current_dist += veh_total_dist_to_rear[y]
    if (current_dist < minimal_dist)
        minimal_dist = current_dist
        best_gap = x
```

As a result, best_gap shows, which gap from the N+1 gaps should be made the optimized parking spot 52.

During a parking or unparking maneuver, as it is illustrated in FIG. 6a, it may also be possible to temporarily reduce the parking distance $d_{Park}$ of the autonomous vehicles 16 to a minimum parking distance $d_{min}$, as it is illustrated in FIG. 6b, in order to increase the available maneuvering space for the host vehicle 26. After the host vehicle 26 has entered or left the parking spot, the autonomous vehicles 16 may be moved back to their optimized parking distances $d_{Park}$ to an adjacent vehicle or object.

Figure 7:
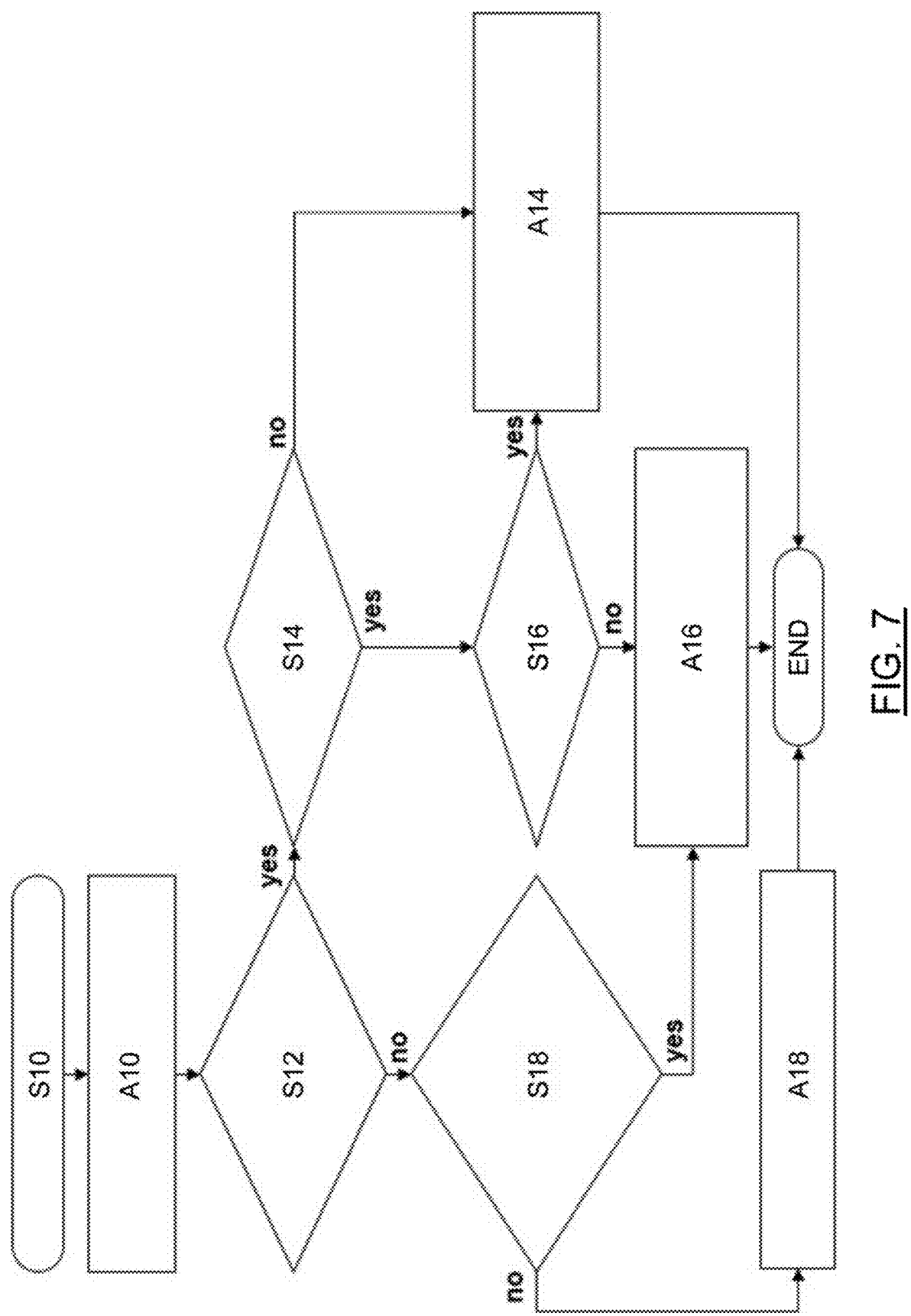
FIG. 7 shows an example of a parking assistance method according to the present invention.

In FIG. 7 an exemplary embodiment of a parking assistance method according to the present invention is described.

Beginning at a step S10, it is assumed that a host vehicle 26 is intended to park, i.e. is set to a parking mode in which the host vehicle is searching for a suitable parking spot. Therefore, the host vehicle 26, in particular the distance measuring unit 34, is measuring distances (free spaces) in front of and/or behind parked autonomous vehicles 16 as an action A10.

In a next step S12 it is determined if at least one measured distance is large enough to park the host vehicle 26 in it. in the affirmative case (step S12: "yes") that a measured distance is large enough to park the host vehicle 26 in it, the process proceeds to a step S14 in which it is determined if the host vehicle 26 is intended to park at a specific location. If this is not the case (step S14: "no"), a "best distance"

among the measured distances, e.g. a largest, nearest etc. distance, is chosen and the host vehicle 26 is parked there (action A14) and the process is terminated.

In the affirmative case of step S14 (step S14: "yes"), the process proceeds to a step S16 in which it is determined if there is a suitable gap near to the specific location. In the affirmative case of step S16 (step S16: "yes"), the process proceeds to the action A14.

In the negative case of step S16 (step S16: "no"), the process proceeds to an action A16 in which the parking space is optimized, as described above, and the host vehicle 26 is parked at/near the specific location. After that, the process is terminated.

In the negative case of step S12 (step S12: "no"), the process proceeds to a step S18 in which it is determined whether or not the sum of all free spaces (distances) around movable vehicles is large enough to park the host vehicle, i.e. is at least as large as $d_{CarLen}$.

In the affirmative case of step S18 (step S18: "yes"), the process proceeds to the action A16 of optimizing the parking space. In the negative case of step S18 (step S18: "no"), the process proceeds to an action A18 informing the user of the host vehicle 26 about the lack of space and/or adapting an action plan of the host vehicle 26, for example, in order to continue driving. After action A18, the process is terminated.

What is claimed is:

1. A parking assistance device configured to be mounted in a host vehicle, comprising:
    a processor; and
    a memory comprising instructions that, when executed, cause the processor to implement:
        an autonomous vehicle detecting unit configured to detect whether a vehicle parked within a predetermined range in the vicinity of the host vehicle is an autonomous vehicle configured to move autonomously,
        a parking space optimization area detecting unit configured to detect at least one parking space optimization area as an area in which a consecutive number of at least one autonomous vehicle is parked between a first end of the parking space optimization area defined by an object that is not configured to be moved autonomously or an end of an associated parking allowance area in front of the consecutive number of at least one autonomous vehicle and a second end of the parking space optimization area defined by another object that is not configured to be moved autonomously or another end of an associated parking allowance area behind the consecutive number of at least one autonomous vehicle,
        a distance measuring unit configured to measure a distance in front of or behind the at least one autonomous vehicle parked in the at least one parking space optimization area,
        a parking spot determining unit configured to determine whether or not at least a subset of the distances measured by the distance measuring unit is equal to or larger than a predetermined distance required for parking the host vehicle, and
        a communication unit configured to output a movement command to the at least one parked autonomous vehicle, said movement command including an identification information for identifying one of the at least one parked autonomous vehicle and a direction information indicating whether the identified autonomous vehicle is to be moved in the forward direction or in the backward direction,
    wherein the direction of the direction information of the movement command in which the identified autonomous vehicle is to be moved is determined according to the smaller value of a comparison of the two travel distances the identified autonomous vehicle has to travel in each direction.

2. The parking assistance device according to claim 1, wherein said movement command further includes a distance information indicating by which distance the identified autonomous vehicle is to be moved.

3. The parking assistance device according to claim 1, wherein the movement command is configured to trigger all of the parked autonomous vehicles detected by the autonomous vehicle detection unit to be moved for optimizing the parking space optimization area to move into the same direction.

4. The parking assistance device according to claim 1, wherein the movement command is configured to trigger all of the parked autonomous vehicles detected by the autonomous vehicle detection unit to be moved for optimizing the parking space optimization area to move in a direction away from a location where a distance currently or recently measured by the distance measuring unit is located.

5. The parking assistance device according to claim 1, wherein the processor is further caused to implement a parking spot setting unit configured to set a location that is closest to the host vehicle as a parking spot to be optimized by the parking assistance device within the parking space optimization area.

6. The parking assistance device according to claim 5, wherein the parking spot setting unit is configured to set the location closest to the host vehicle as a parking spot to be optimized only when the velocity of the host vehicle is equal or below a predetermined threshold.

7. The parking assistance device according to claim 1, wherein said movement command further includes a parking distance information indicating at which predetermined distance to an object, towards which the identified autonomous vehicle is approaching in response to the movement command, the identified autonomous vehicle is to be stopped.

8. The parking assistance device according to claim 7, wherein the predetermined distance is individually adjustable for each distance and/or for each autonomous vehicle.

9. The parking assistance device according to claim 1, wherein the processor is further caused to implement an environment monitoring unit configured to monitor an environment surrounding the host vehicle.

10. The parking assistance device according to claim 9, wherein the environment monitoring unit is configured to monitor the environment surrounding the host vehicle every time a preset time period has lapsed.

11. The parking assistance device according to claim 1, wherein the processor is further caused to implement a warning unit configured to output a warning signal by using visual and/or acoustical means to the surrounding environment of the host vehicle indicating that the host vehicle is moving and/or is about to move.

12. The parking assistance device according to claim 1, wherein the communication unit is further configured to output a movement command to the at least one parked autonomous vehicle in response to at least one of unlocking the host vehicle, starting the host vehicle, and a remote travel request received by the host vehicle.

13. A parking assistance method, comprising the steps of:
- detecting whether a vehicle parked within a predetermined range in the vicinity of the host vehicle is an autonomous vehicle configured to move autonomously;
- detecting at least one parking space optimization area as an area in which a consecutive number of at least one autonomous vehicle is parked between a first end of the parking space optimization area defined by an object that is not configured to be moved autonomously or an end of an associated parking allowance area in front of the consecutive number of at least one autonomous vehicle and a second end of the parking space optimization area defined by another object that is not configured to be moved autonomously or another end of an associated parking allowance area behind the consecutive number of at least one autonomous vehicle;
- measuring distances in front of or behind the at least one autonomous vehicle parked in the at least one parking space optimization area;
- determining whether or not at least a subset of the measured distances is equal to or larger than a predetermined distance required for parking the host vehicle; and
- outputting a movement command to the at least one parked autonomous vehicle, said movement command including an identification information for identifying one of the at least one parked autonomous vehicle and a direction information indicating whether the identified autonomous vehicle is to be moved in the forward direction or in the backward direction,
- wherein the direction of the direction information of the movement command in which the identified autonomous vehicle is to be moved is determined according to the smaller value of a comparison of the two travel distances the identified autonomous vehicle has to travel in each direction.

14. The parking assistance method according to claim 13, wherein said movement command further includes a parking distance information indicating at which predetermined distance to an object towards which the identified autonomous vehicle is approaching in response to the movement command the identified autonomous vehicle is to be stopped and/or said movement command further includes a distance information indicating by which distance the identified autonomous vehicle is to be moved.

* * * * *